United States Patent Office 3,376,146
Patented Apr. 2, 1968

3,376,146
LOW DENSITY CEMENT COMPOSITION
Farris Mitchell, Dallas, Tex., assignor to Mobil Oil Corporation, a corporation of New York
No Drawing. Filed Oct. 30, 1964, Ser. No. 407,866
2 Claims. (Cl. 106—97)

ABSTRACT OF THE DISCLOSURE

This specification discloses a low density cement composition, and an aqueous slurry thereof, comprising portland cement and particulate carbon, such as ground anthracite coal. The particulate carbon is of a size that will pass through a 20-mesh standard screen and is in the amount of from 25 to 233 percent by weight of the portland cement. The slurry may also contain other cement additives such as salts of lignosulfonic acid, various cellulose derivatives, calcium chloride, sodium chloride, and oil.

---

This invention relates to cements and relates more particularly to low density cement compositions for use in subterranean wells.

Frequently, in the drilling and treatment of wells extending from the surface of the earth into subterranean formations, it is necessary or desirable to employ a cement composition. For example, in the drilling of a well for the recovery of oil or gas from a subterranean formation, the casing is secured in place in the well by cementing. In this cementing operation, a cement slurry is pumped downwardly from the surface of the earth through tubing to the bottom of the well and thence upwardly between the casing and the walls of the well. After the cement slurry has been pumped between the casing and the walls of the well, pumping is discontinued and the cement is permitted to set in place. Further, for example, in the drilling of such wells, porous formations are often encountered from which an undesired fluid, such as water, flows into the well or into which the drilling mud used in the drilling of the well is lost. The method of correcting for such conditions encountered during the drilling operation is to seal the porous formation with cement. In these, and other cementing operations in a well, an aqueous slurry of portland cement is commonly used.

In cementing procedures in a well, it is desirable that the cement slurry have a low density, preferably equal to or only slightly greater than the density of the drilling fluid used in drilling the well. High density cement slurries require higher pumping pressures in order to place them at the desired position in the well. Additionally, high density cement slurries impose high static and dynamic pressures upon not only the formation to be treated but upon other formations as well. Where these other formations are porous, the high pressure can result in loss of the cement slurry into the formations, or loss of the water from the cement slurry into the formations with the resultant setting of the cement prematurely at an unintended position in the well. Reduction in the density of cement slurries for use in wells is ordinarily effected by mixing bentonite with the cement, which permits the inclusion of greater amounts of water in the slurry. The water has a lesser density than the dry cement; and as a result, the bulk volume of the slurry per unit amount of cement is increased. To achieve the requisite low density cement slurry, large quantities of water and bentonite are required. However, the inclusion of large quantities of water and bentonite in the cement slurry adversely affects the shrinkage, the permeability, and the compressive strength of the set cement as discussed more fully hereinafter. The compressive strength is the commonly used index for measuring strength of cements.

It has been suggested that the cement slurry have included therein certain inert additives which have a low density, e.g., wood fiber and gilsonite. Each of the additives which has been proposed has one or more disadvantage which limits its usefulness. Some of the additives are subject to bacterial attack and deterioration. Other additives decay in the high temperature, moist environments prevalent in subterranean formations. Other additives are oil-soluble and deteriorate in the presence of hydrocarbons with the result that the cement loses compressive strength in oil-containing subterranean formations.

Accordingly, it is an object of this invention to provide a cement composition which is employed in making a durable, very low density cement which has a higher compressive strength than heretofore obtainable with a formulation used in making cement having the same low density.

It is another object of this invention to provide a low density cement slurry which results in a substantially impermeable cement having a satisfactory compressive strength upon setting.

It is another object of this invention to provide a low density cement composition which is employed in making a cement which retains satisfactory compressive strength in an oil-containing subterranean formation.

It is another object of this invention to provide a cement composition which reduces the density of cement slurries made therefrom without excessively retarding or accelerating the setting thereof or excessively reducing the compressive strength of the set cement.

It is a particular object of the invention to provide a method of carrying out cementing operations in a well whereby a low density, substantially impermeable cement having adequate compressive strength is set therein within a reasonable time.

Further objects of the invention will become apparent from the following description.

In accordance with the invention, there is provided a cement composition containing portland cement and, as the essential ingredient with respect to providing satisfactory properties at the desired low density, particulate carbon in an amount of from 25 to 233 percent by weight of the portland cement in the cement composition. Stated another way, the particulate carbon may comprise from 20 to 70 percent by weight of total solids of the cement composition. By satisfactory properties is meant that the cement composition can be admixed with a suitably low proportion of water yet afford a low density slurry which will set to form a sound, substantially impermeable cement having adequate compressive strength.

By particulate carbon is meant solid carbon particles of a size which pass through a 20-mesh standard screen. The particulate carbon includes, but is not limited to, ground lignite coal, bituminous coal, anthracite coal, graphite, petroleum coke, and coke obtained from low or high temperature carbonization of coal. The hard carbon particles such as obtained from anthracite coal are preferred. The particulate carbon employed has a surface area comparable to that of the cement and much less than 100 square meters per gram. The particulate carbon employed is not in the form of activated carbon since the undesirably high surface area of activated carbon creates problems in achieving the desired setting time of the cement. The particulate carbon has a specific gravity of less than about 1.5 and weighs less than about 85 pounds per cubic foot. On the other hand, portland cement has a specific gravity of about 3.2 and weighs about 200 pounds per cubic foot.

The particulate carbon is insoluble in oil. Thus, it does not deteriorate in the presence of hydrocarbons.

Further, set cement in which the desired low density has been obtained using particulate carbon retains adequate compressive strength in an oil-containing subterranean formation.

The cement slurry containing the particulate carbon, portland cement, and water may also contain other materials commonly employed in cement slurries for use in wells. For example, the cement slurry may contain various additives for prolonging the pumping time. Thus, the cement slurry may contain salts of lignosulfonic acid or various other celulose derivatives, such as carboxymethylcelulose and its salts and carboxymethylhydroxyethylcellulose. Additionally, the cement may contain calcium chloride or sodium chloride. In this connection, the water employed for preparing the cement slurry may be sea water; and in this way, the slurry will contain sodium chloride. Additionally, the cement slurry may contain various additives for reducing filter loss. Along this line, the cellulose derivatives mentioned above lower the filter loss of the cement slurry. The cement slurry may also contain oil as an additive. The oil can be in the form of a dispersed phase or may be the continuous phase. For example, the entire liquid phase of the cement slurry may be an emulsion wherein the oil is the continuous phase of the emulsion. The amounts of these other materials which can be added to the cement slurry may be those ordinarily employed in connection with commercial cements for use in wells.

It is present practice to lower the density of oil well cement by increasing the ratio of water-to-cement. It is difficult to obtain sound, substantially impermeable cements from slurries having densities much below 15 pounds per gallon using this method because the excess water tends to form pockets of free water not associated with the cement. This forms a permeable set cement which has a low compressive strength and a high shrinkage, i.e., when the water is lost by evaporation or is used in hydration of the cement, the bulk volume shrinks excessively. The amount of water which can be employed in a cement slurry may be increased by employing a gel cement, i.e., admixing portland cement with a clay such as bentonite as previously mentioned. This provides satisfactory set cements from slurries which have densities of about 14 pounds per gallon. It is difficult to obtain sound, substantially impermeable cements from slurries having densities much below 14 pounds per gallon even using bentonitic clays with the cement and water because the excess water again tends to form pockets of free water. This again results in a permeable set cement which has a high shrinkage and a low compressive strength, and hence is undesirable for use in cementing operations in a well.

It is in achieving sound, substantially impermeable cements having densities lower than 14 pounds per gallon that the cement composition of this invention has particular application. The cement composition of the invention allows employing a very low weight ratio of water-to-solids, e.g., from 0.3 to 0.4, while still realizing a pumpable cement slurry having the desired low density. This is equivalent to from 23 to 28 percent by weight of water in the cement slurry. The cement slurry thus sets to form a much less permeable cement which has demonstrably better compressive strength than the standard low density bentonite gel cements commonly used at present. Higher ratios of water-to-solids may be employed to reduce the density of the cement slurry of the invention even further. Desirably, ratios of water-to-solids above about 0.65 to to 0.7 are not employed because the shrinkage of set cement exceeds API recommended values at higher ratios. This is equivalent to about 40 percent by weight of water in the cement slurry.

The following example is illustrative of the invention. The samples used in the example were prepared employing a commercial cement of the Class A type, American Petroleum Institute. The particulate carbon employed was ground anthracite coal passed through a standard 20- mesh screen. The bentonite employed was the commercially available Magcogel. The compressive strengths reported in the following data represent the strength of the sample after curing for the designated time interval at 140° F. The densities of the slurries were measured in accordance with Section IV of the "API Recommended Practice for Testing Oil-Well Cements and Cement Additives" of the American Petroleum Institute, API, RP 10B, 10th edition, March 1961. The preparation of the samples is illustrated by Samples I, II, and III. The same procedures, but different proportions, were used in preparing the four other samples. The proportions and data on all seven samples are shown in Table I. The word "solids" is used as a generic term replacing "portland cement," "cement composition," or "gel cement."

Sample I was prepared by admixing portland cement and water in the ratio of 46 parts by weight of water to 100 parts by weight of cement. This afforded a slurry density of 15.6 pounds per gallon and a 24-hour compressive strength of 3175 pounds per square inch (p.s.i.).

Sample II was prepared by admixing a first cement composition and water in the ratio of 40 parts by weight of water to 100 parts by weight of cement composition. The cement composition was comprised of 50 pounds of particulate carbon and 94 pounds of portland cement. This afforded a slurry density of 13.3 pounds per gallon and a 24-hour compressive strength of 1380 p.s.i.

Sample III was prepared by admixing a gel cement and water in the ratio of 79 parts by weight of water to 100 parts by weight of gel cement. The gel cement was comprised of 8 pounds of bentonite and 92 pounds of portland cement. This afforded a slurry density of 13.3 pounds per gallon and a 24-hour compressive strength of 1168 p.s.i.

It will be noted from Table I that the ratios of water-to-solids, i.e., water/solids, for the slurries using the particulate carbon and cement were appreciably lower than the ratios of water-to-solids for the slurries using the bentonite and cement, even though the same low densities were not completely achieved with the latter. It will also be noted that the compressive strengths of the set cement using the particulate carbon and cement were superior to the compressive strengths of the set cement using the bentonite and cement. Lowering the densities of the bentonite and cement slurries to achieve exactly the same densities as the carbon-cement slurries requires even more water and further lowers the compressive strength of the set cements.

TABLE I

| Sample No. | Solids, or Cement Composition | Water/Solids (Wt. basis) | Slurry Density (lb./gal.) | Compressive Strength (lb./sq. in.) 24 hr. |
|---|---|---|---|---|
| I | Cement | 0.46 | 15.6 | 3,175 |
| II | {50 lb. carbon / 94 lb. cement} | 0.40 | 13.3 | 1,380 |
| III | {8 lb. bentonite / 92 lb. cement} | 0.79 | 13.3 | 1,168 |
| IV | {100 lb. carbon / 94 lb. cement} | 0.39 | 12.4 | 710 |
| V | {12 lb. bentonite / 88 lb. cement} | 0.96 | 12.6 | 623 |
| VI | {200 lb. carbon / 94 lb. cement} | 0.37 | 11.3 | 225 |
| VII | {20 lb. bentonite / 80 lb. cement} | 1.29 | 11.3 | 152 |

While the invention has been described particularly in connection with cementing operations in a well, it will be understood that it may be employed in any circumstances where a low density portland cement composition or slurry is required.

Having thus described my invention, it will be understood that such description has been given by way of illustration and example and not by way of limitation, reference for the latter purpse being had to the appended claims.

What is claimed is:

1. A cement slurry that can be pumped down a well and back up an annular space outside a conduit within said well and that can set to form a substantially impermeable cement in said well, said cement slurry having a density of less than 14 pounds per gallon and comprising portland cement; ground anthracite coal having a specific gravity of less than about 1.5, being capable of passing through a 20-mesh standard screen, having a surface area of less than 100 square meters per gram, and being in an amount of from 25 to 233 percent by weight of said portland cement; and water in an amount of from 23 to 40 percent by weight of said slurry.

2. The cement slurry of claim 1 wherein said slurry also contains salts of lignosulfonic acid for prolonging pumping time and cellulose derivatives selected from the group consisting of carboxymethylcellulose, its salts, and carboxymethylhydroxyethylcellulose, for reducing filter loss from said slurry.

References Cited

UNITED STATES PATENTS

| | | | |
|---|---|---|---|
| 135,582 | 2/1873 | Pfund | 106—97 |
| 991,419 | 5/1911 | Brand | 106—97 |
| 2,303,629 | 12/1942 | Gelinas | 106—97 |
| 2,609,882 | 9/1952 | Morgan et al. | 106—97 |
| 2,665,977 | 1/1954 | Engelhart | 106—90 |
| 2,803,555 | 8/1957 | Clark et al. | 106—97 |
| 3,117,882 | 1/1964 | Herschler et al. | 106—90 |
| 3,131,075 | 4/1964 | Brooks | 106—90 |
| 3,197,317 | 7/1965 | Patchen | 166—29 |
| 3,220,863 | 11/1965 | Mayhew | 106—97 |
| 3,234,035 | 2/1966 | Small et al. | 106—97 |

FOREIGN PATENTS

| | | |
|---|---|---|
| 705,964 | 3/1954 | Great Britain. |

TOBIAS E. LEVOW, *Primary Examiner.*

S. E. MOTT, *Assistant Examiner.*